United States Patent [19]

Lee et al.

[11] Patent Number: 5,639,818
[45] Date of Patent: Jun. 17, 1997

[54] PEROXIDE MODIFIED PP/PE BLENDS WITH SUPERIOR MELT STRENGTH

[75] Inventors: Chun D. Lee; Ramesh N. Shroff; Manivakkam J. Shankernarayanan, all of Cincinnati, Ohio

[73] Assignee: Quantum Chemical Corporation, Cincinnati, Ohio

[21] Appl. No.: 212,630

[22] Filed: Mar. 11, 1994

[51] Int. Cl.$^6$ .................... C08L 23/04; C08L 33/04
[52] U.S. Cl. .................... 524/515; 524/523; 524/524; 525/194; 525/197; 525/222; 525/227; 525/240
[58] Field of Search .................. 525/194, 197, 525/222, 227, 240; 524/515, 523, 524

[56] References Cited

U.S. PATENT DOCUMENTS

| | | | |
|---|---|---|---|
| 3,607,987 | 9/1971 | Walton et al. | 260/897 |
| 3,764,589 | 10/1973 | Bond, Jr. et al. | 260/80.71 |
| 3,804,919 | 4/1974 | Schrage et al. | 260/827 |
| 4,048,129 | 9/1977 | Voigt | 260/23 H |
| 4,087,485 | 5/1978 | Huff | 200/897 |
| 4,115,612 | 9/1978 | Closson, Jr. | 428/172 |
| 4,234,656 | 11/1980 | Amembal et al. | 260/897 |
| 4,375,531 | 3/1983 | Ross | 428/379 |
| 4,412,041 | 10/1983 | Kitahara et al. | 525/154 |
| 4,412,042 | 10/1983 | Matsuura et al. | 525/262 |
| 4,508,872 | 4/1985 | McCullough, Jr. | 525/192 |
| 4,533,602 | 8/1985 | Nakamura et al. | 428/447 |
| 4,558,094 | 12/1985 | Deguchi et al. | 525/71 |
| 4,618,654 | 10/1986 | Schmidtchen et al. | 525/288 |
| 5,066,723 | 11/1991 | Randall, Jr. et al. | 525/194 |
| 5,166,225 | 11/1992 | Asanuma et al. | 522/112 |
| 5,169,900 | 12/1992 | Gudelis | 525/106 |
| 5,218,046 | 6/1993 | Audureau et al. | 525/194 |

FOREIGN PATENT DOCUMENTS 61-23634  2/1986  Japan .

*Primary Examiner*—Paul J. Thibodeau
*Assistant Examiner*—Mary Critharis
*Attorney, Agent, or Firm*—Gerald A. Baracka; William A. Heidrich

[57] ABSTRACT

The instant invention is directed to a process for preparing peroxide modified polypropylene/polyethylene blends that have superior extrusion coating properties. More specifically, the peroxide modified PP/PE blends produced by the instant invention exhibit a pronounced viscosity upturn at low frequencies (about <1.0 rad/sec) in the dynamic rheological data. Specifically, the blends show an increase in their dynamic complex viscosity, $\eta^*$, and dynamic storage modulus, G' values at frequencies of less than about 1.0 rad/sec. The present invention also relates to peroxide modified PP/PE blends that are produced from the process of the instant invention. Such polymeric blends that are produced from the inventive method exhibit superior dynamic theological properties, especially melt strength, compared with prior art blends. Moreover, the peroxide modified PP/PE blends of the present invention show markedly reduced draw resonance behavior. Thus, the PP/PE blends of the present invention having the above-identified characteristics will be suitable for a wide variety of applications, such as thermoforming, blow molding and, preferably, extrusion coatings.

33 Claims, 1 Drawing Sheet

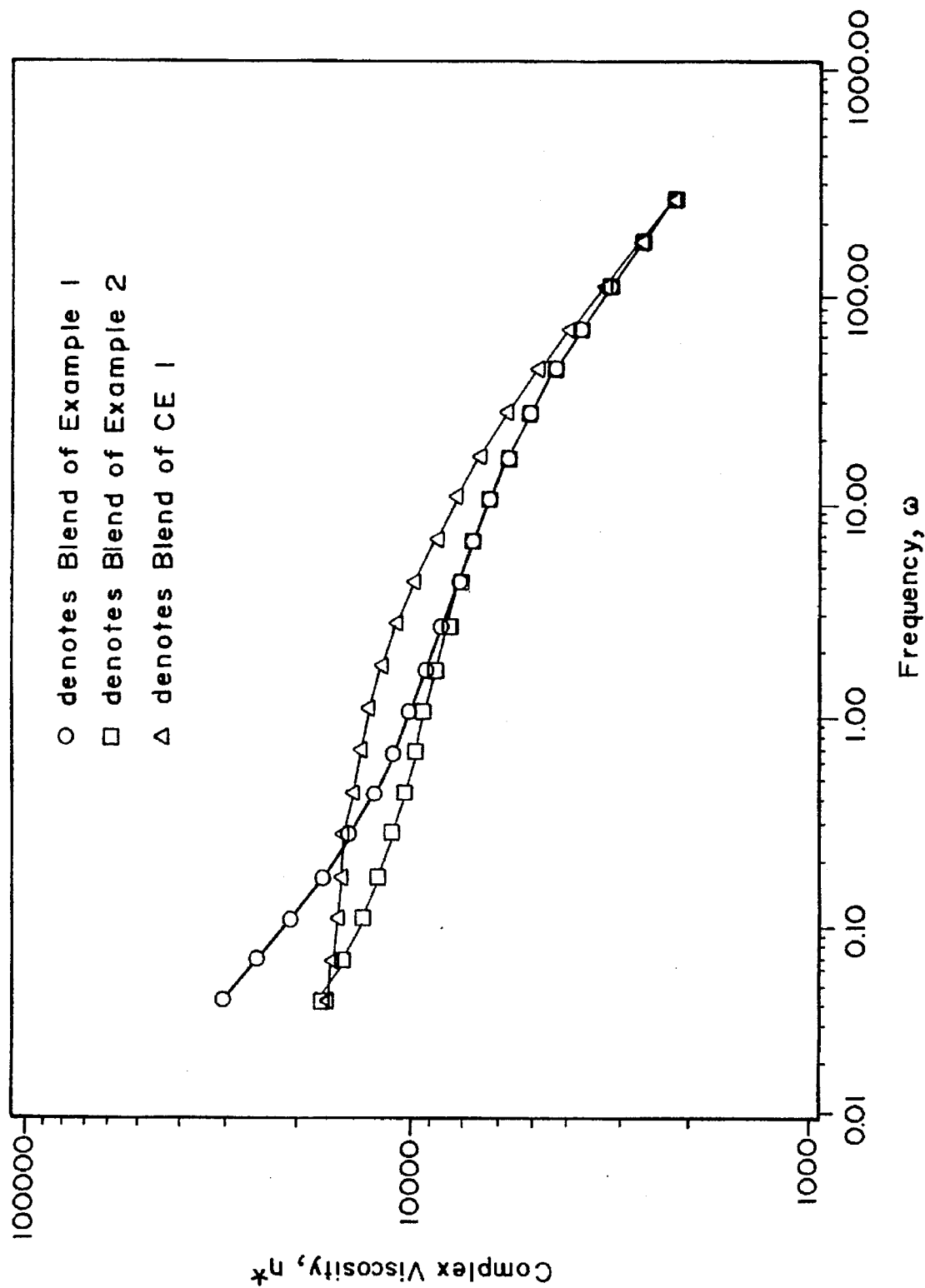

PEROXIDE MODIFIED PP/PE BLENDS WITH SUPERIOR MELT STRENGTH

FIELD OF THE INVENTION

The instant invention is directed to a process for preparing peroxide modified polypropylene/polyethylene blends that have superior extrusion coating properties. More specifically, the peroxide modified PP/PE blends produced by the instant invention exhibit a pronounced viscosity upturn at frequencies of less than about 1.0 rad/sec in their dynamic rheological data. Specifically, the blends show an increase in their dynamic complex viscosity, $\eta^*$, and dynamic storage modulus, G', values at frequencies of less than about 1.0 rad/sec.

The present invention also relates to peroxide modified PP/PE blends that are produced from the process of the instant invention. Such polymeric blends that are produced from the inventive method exhibit superior dynamic rheological properties, especially melt strength, compared with prior art blends. Moreover, the peroxide modified PP/PE blends of the present invention show markedly reduced draw resonance behavior. Thus, the PP/PE blends of the present invention having the above-identified characteristics are suitable for a wide variety of applications, such as thermoforming, blow molding and, preferably, extrusion coatings.

BACKGROUND OF THE INVENTION

Extruding a coating of a polyolefin or blends of polyolefins onto a substrate, such as paper or aluminum foil, to form an extrusion coated substrate is well known in the art. Various blends of polyethylene and other polyolefins have been successfully developed and used as extrusion coating compositions in the prior art. However, a polyolefin such as crystalline polypropylene alone, regardless of its molecular weight, i.e. flow rate, is not a satisfactory extruding coating composition since it does not exhibit high speed coating ability over a wide range of coating weights. Therefore, many of the excellent physical properties of polypropylene cannot be utilized in extrusion coating applications.

In order to improve the extrusion coating properties of polypropylene, blends of polyethylene and polypropylene have been developed and used as an extrusion coating. Typically, the PP/PE blends disclosed in the prior art comprise a blend of a visbroken polypropylene polymer and an ethylene homopolymer or copolymer or a blend of polypropylene and a homopolymer or copolymer of ethylene which is visbroken with a peroxide compound in an extruder. The term "visbroken" as used in the prior art means heating a polymer or a mixture of polymers to effect degradation via thermal cracking to produce a product having segments of lower molecular weight, evidenced by a greater flow rate. Hence, visbroken polymeric blends do not contain long chain branching therein.

U.S. Pat. No. 3,607,987 to Walton et al. provides an improved coating composition which comprises a blend of a major amount of a thermally cracked, i.e. visbroken, copolymer of ethylene and propylene, the copolymer containing no more than about 5 weight percent ethylene based oF the total weight of the copolymer and having a melt flow after visbreaking in the range from about 40 to about 110, with a minor amount of a low density homopolymer of ethylene.

U.S. Pat. No. 4,375,531 to Ross relates to blends of polypropylene based polymeric materials which are visbroken in order to impart both high impact and high melt flow rate properties to the polymeric material. Specifically, the visbroken polymeric compositions comprise a first component which is selected from the group consisting of block copolymers of propylene and ethylene, reactor-made intimate mixtures of polypropylene and randomly oriented copolymers of propylene and ethylene, and a second component which is selected from the group consisting of low density polyethylene, ethylene-vinyl acetate copolymers, acrylate-modified polyethylene, high density polyethylene, ethylene-propylene rubber (EPR or EPDM), and blends thereof.

Another typical blend that is used in the prior art is disclosed in U.S. Pat. No. 4,508,872 to McCullough et al. More specifically, McCullough et al. relates to modified propylene polymer compositions that have improved flow and impact resistance characteristics. The modified propylene polymer compositions disclosed in this reference are obtained by visbreaking a blend of an impact modified propylene polymer, a high density ethylene homopolymer (HDPE) and a linear low density ethylene copolymer (LLDPE). In a preferred embodiment, the impact-modified propylene polymer is visbroken separately and then melt blended with a mixture of HDPE and LLDPE.

Japanese Kokai Patent Application No. Sho 61-23634 relates to improved polypropylene composites useful for extrusion coating applications. The composites disclosed in this reference are made by mixing 60–95 parts by weight of a heat-treated polypropylene polymer which is obtained by heat treating polypropylene resins in the presence of peroxide and 5–40 parts by weight of polyethylene that has a crystallinity of greater than 25% as determined by X-ray analysis. Alternately, the compositions can be prepared by heat treating, in the presence of peroxide, a resin mixture which comprises 60–95 parts by weight polypropylene and 5–40 parts by weight of the foregoing mentioned polyethylene. The polypropylene composites produced in the japanese patent are said to exhibit improved moldability. It is emphasized that the term "heating treating" is used in this reference to denote visbreaking.

U.S. Pat. No. 5,066,723 to Randall, Jr. et al. provides impact-modified polymers which comprise visbroken reactor blends of free radical decomposable olefin polymers and free radical crosslinkable thermoplastic olefin polymers. More specifically, the impact-modified polymers are obtained by visbreaking a reactor blend of polypropylene and thermoplastic polyethylene materials. Such impact-modified polymeric materials are said to exhibit unexpected compatibility characteristics, increased impact resistance at low temperatures, improved antiblush characteristics and improved flow characteristics.

U.S. Pat. No. 5,218,046 to Audureau et at. relates to thermoplastic compositions that exhibit improved mechanical properties such as low temperature resilience, elongation and tensile strength and a method for producing the same. Briefly, the process disclosed in Audureau et al. involves visbreaking an ethylene polymer or ethylene copolymer and then mixing the visbroken product with a propylene polymer or propylene copolymer.

Despite the current state of the art, none of the references noted hereinabove disclose a process for preparing high flow rate thermoplastic polymeric compositions, which exhibit superior melt strength and reduced draw resonance behavior, by melt mixing above the decomposition temperature of the peroxide, a mixture comprising a high propylene content polymeric component and a non-crosslinked polymeric component which has previously been intimately precontacted with a peroxide compound well below the decomposition temperature of the peroxide and the melting point of the polymers, as does the present invention.

Moreover, none of these references disclose the alternative method of the instant invention. That is, none of the references listed hereinabove disclose a process for preparing a peroxide PP/PE blend which comprises first blending the aforementioned high propylene content polymeric component and the non-crosslinked polymeric component and then intimately contacting the aforementioned blend with a sufficient amount of a peroxide to provide a peroxide adsorbed composition.

In contrast to the methods disclosed in the instant invention, all of the above-identified references require that the polymers or the polymer blends be visbroken. As mentioned hereinabove, polymers that are visbroken do not contain long-chain polymer branching. Consequently, the PP/PE blends described in the prior art do not exhibit the unexpected viscosity upturn in their dynamic melt rheological data at frequencies of less than about 1.0 rad/sec. which is exhibited by the blends of the instant invention.

SUMMARY OF THE INVENTION

According to the instant invention there is provided a process for producing peroxide modified polypropylene (PP)/polyethylene (PE) blends that have superior melt strength and show reduced draw resonance behavior. Specifically, the present invention relates to a process for preparing high flow rate thermoplastic polymeric blends by melt mixing above the decomposition temperature of the peroxide, a mixture comprising a high propylene content polymeric component and a non-crosslinked polymeric component which has previously been intimately precontacted with a peroxide at a temperature below the decomposition temperature of the peroxide and the melting point of the polymers.

The high propylene content polymeric component employed in the present invention is a propylene polymer or copolymer selected from the group consisting of homopolymers of propylene, block copolymers of propylene and ethylene, and thermoplastic olefin polymers. The non-crosslinked polymeric component employed in the instant invention is selected from the group consisting of long-chain branched polymers, such as LDPE, and ethylene copolymers containing silanes, vinyl acetate, methyl acrylate, n-butyl acrylate or $\alpha,\omega$-dienes.

The term intimately precontacted is used herein to denote that the peroxide is only physically adsorbed onto the surface of the non-crosslinked polymeric component. Hence, no apparent crosslinking of the polymer occurs in this stage. Long-chain branching is an essential characteristic of the blends of the instant invention since it is required to produce blends that exhibit reduced draw resonance behavior and an upturn in their rheological data at frequencies of less than about 1.0 rad/sec. Furthermore, since no appreciable crosslinkage occurs, the compatability of the individual components of the blends of the instant invention is greatly improved.

The present invention further provides an alternative process for intimately contacting a blend of the aforementioned high propylene content polymeric component and the non-crosslinked polymeric component. As used herein, the term intimately contacting denotes that the peroxide is only physically adsorbed onto the surface of the aforementioned blend, thus no apparent crosslinking occurs.

The blends of the instant invention produced by the two processes mentioned hereinabove have a characteristic upturn in their dynamic melt rheological data compared to prior art blends that are made by visbreaking the polymeric composition. Specifically, the peroxide modified PP/PE blends of the instant invention exhibit an unexpected upturn of their dynamic complex viscosity, $\eta^*$, and dynamic storage modulus, $G'$, values. Furthermore, the blends produced by the aforementioned processes have superior melt strength compared with art equivalent compositions. Moreover, the peroxide modified PP/PE blends of the instant invention have reduced draw resonance behavior compared with prior art blends, thus the PP/PE blends of the instant invention are useful in thermoforming, blow molding and extrusion coating applications.

DETAILED DESCRIPTION OF THE DRAWINGS

The sole FIGURE represents a graph of the dynamic complex viscosity, $\eta^*$, vs. the frequency, $\omega$, of the PP/PE blends of Examples 1 and 2 and Comparative Example 1.

DETAILED DESCRIPTION OF THE INVENTION

The present invention provides processes for preparing peroxide modified polypropylene/polyethylene (PP/PE) blends. In the preferred embodiment of the instant invention, the PP/PE blends are prepared by first intimately precontacting a non-crosslinked polymeric component with a peroxide compound at a temperature below the decomposition temperature of the peroxide and below the melting point of the non-crosslinked polymeric component to produce a peroxide adsorbed polymeric component. The peroxide adsorbed polymeric component thus produced is then melt mixed at a temperature above the decomposition temperature of the peroxide to provide a peroxide adsorbed PP/PE blend.

In another embodiment of the instant invention, the peroxide modified PP/PE blends are prepared by first blending a non-crosslinked polymeric component with a high propylene polymeric component, and then intimately contacting the aforementioned blend with a peroxide at a temperature below the decomposition of the peroxide and the melting point of the polymers in an amount sufficient for the peroxide to be physically adsorbed onto the surface of the polymeric blend.

It should be emphasized herein that the amount of peroxide employed in the aforementioned processes is sufficient to maintain the long-chain branching of the non-crosslinked polymer component without initiating crosslinkage thereof. Moreover, the amount of peroxide employed in the present invention is sufficient to form free radicals on the non-crosslinked polymeric component, thus improving the compatability of that component for the high propylene polymeric component.

The high propylene content polymeric component employed in the present invention is a propylene polymer or copolymer selected from the group consisting of homopolymers of propylene, block copolymers of propylene and ethylene and thermoplastic olefin polymers. The aforementioned propylene polymers employed in the instant invention are produced by processes that are well known in the art. For example, U.S. Pat. Nos. 4,579,919, 4,843,132 and 4,857,613, which are incorporated herein by reference, describe various processes for making such propylene polymers.

The non-crosslinked polymeric component employed in the instant invention is selected from the group consisting of long-chain branched polymers, such as LDPE, and ethylene copolymers containing silanes, vinyl acetate, methyl acrylate, n-butyl acrylate or $\alpha,\omega$-dienes. The aforementioned ethylene copolymers can be obtained by conventional copolymerization processes or by grafting. It is emphasized herein that the noncrosslinked polymeric component must have long chain branching therein otherwise the final polymeric composition will tend to exhibit draw resonance behavior.

It is noted that the term "draw resonance" is defined as a limit cycle corresponding to a sustained periodic oscillation in the velocity and cross-sectional area of a drawing process when the boundary conditions are a fixed velocity at the exit of an extruder and a fixed velocity at the take-off position. It occurs when the draw ratio exceeds a critical value. Draw resonance can be thought of as an instability in take-off phenomenon of a material coming from an extruder, more or less homogeneously. The instability manifests itself in the occurrence of periodic fluctuations in the extradite dimensions such as film thickness when a critical value of the take-up speed is exceeded. Draw resonance may be so extreme as to actually break a web or film that extrudes from a die and totally shut down an extrusion coating process.

In general, the silane copolymers mentioned hereinabove include randomly copolymerized products and grafted copolymerized products. More specifically, the silane copolymers of the instant invention comprise ethylene and an unsaturated alkoxysilanes of the formula:

$$R-Si(R^*)_n(Y)_{3-n}$$

wherein R is an ethylenically unsaturated hydrocarbon radical having from 2 to 6 carbon atoms, $R^*$ is a hydrocarbon radical having from 1 to 10 carbon atoms, Y is an alkoxy group having from 1 to 4 carbon atoms and n is an integer from 0 to 2. The silane copolymers employed by the present invention will have melt flow rates greater than 1, and more typically greater than about 3. While the melt index of the melt range may range as high as 500, it generally does not exceed about 300 and, more preferably, will be less than 100.

Random copolymers of ethylene and unsaturated alkoxysilanes, such as vinyltrialkoxysilanes, are known. Such copolymers can be obtained in accordance with any of the recognized procedures such as those described in U.S. Pat. Nos. 3,225,018 and 3,392,156. Generally, these copolymerizations are carried out at high pressures and temperatures in the presence of a free radical initiator. Ethylene copolymers, wherein an unsaturated alkoxysilane is grafted onto the ethylene backbone, are known and can be prepared in accordance with conventional procedures. Free radical initiators, such as peroxides, are generally used to facilitate grafting alkoxysilanes onto polyethylene.

In an preferred embodiment of the present invention, the unsaturated alkoxysilane is vinyltrialkoxysilane, i.e., where R is a vinyl group and n is 0. It is especially advantageous to utilize vinyltrimethoxysilane or vinyltriethoxysilane, i.e., where R is a vinyl group, n is 0 and y is methoxy or ethoxy, respectively. In a preferred embodiment of the present invention the ethylene copolymer is a ethylene copolymer that contains vinyltriethoxysilane grafted to the polyethylene backbone. When the ethylene copolymer is comprised of ethylene and an unsaturated alkoxysilane only, the unsaturated alkoxysilane will constitute from about 20 to about 0.25 weight percent and, more preferably, 10 to 0.5 weight percent of the polymer, the remainder being ethylene.

One or more monomers may be included with the ethylene and unsaturated alkoxysilane. Such comonomers include vinyl esters of $C_{2-6}$ aliphatic carboxylic acids, $C_{1-6}$ alkyl acrylate, and $C_{1-6}$ alkyl methacrylate. The comonomers can be copolymerized with the unsaturated alkoxysilanes and ethylene or the unsaturated alkoxysilane can be grafted onto a copolymer form by copolymerizing ethylene and the comonomer. When comonomers are present, the copolymer will comprise 70 to about 99 percent ethylene, 15 to about 0.5 percent unsaturated alkoxysilane and 15 to 0.5 percent comonomer(s). More commonly, the copolymers will contain 85 to about 97 percent ethylene, 10 to about 2 percent unsaturated alkoxysilane and 5 to 1 percent comonomer. Preferred vinyl esters of $C_{2-6}$ aliphatic carboxylic acids include vinyl acetate and vinyl butyrate. Ethylene acrylate and n-butyl acrylate are particularly preferred $C_{1-6}$ alkyl acrylate comonomers. Ethyl methacrylate is a particularly preferred $C_{1-6}$ alkyl methacrylate.

Another non-crosslinked polymeric component that can be employed in the instant invention is a copolymer of ethylene and a comonomer which may be a vinyl ester or an alkyl acrylate, the later being in the generic sense to encompass esters of both acrylic and methacrylic acids. The vinyl ester may be $C_{2-6}$ aliphatic carboxylic acids, such as vinyl acetate, vinyl propionate, vinyl butyrate, vinyl pentanoate or vinyl hexanoate. The acrylate may be any of the $C_{1-6}$ alkyl esters of acrylic or methacrylic acid including for example, methyl, ethyl, propyl, butyl, pentyl or hexyl acrylate or methacrylate.

A preferred copolymer comprising the long-chain branched polymer of this invention is an ethylenevinyl acetate copolymer (EVA) containing about 2 percent to about 45 percent and, more preferably, 5 to about 30 percent, vinyl acetate, with the balance being ethylene. Terpolymers of ethylene, vinyl acetate and other known olefinic monomers polymerizable therewith can also be employed in the instant invention. Generally, if a third monomer is present it will not constitute more than about 15 percent of the polymer composition.

Another preferred copolymer that is employed in the instant invention is any of those modified products conventionally prepared by copolymerizing ethylene and n-butyl acrylate. Such copolymerizations are well known in the art and generally are carried out at pressures up to about 15,000 psi and temperatures from about 150° C. to about 250° C. in the presence of a suitable catalyst. The copolymerization of ethylene and the n-butyl acrylate is, for example, described in U.S. Pat. No. 2,200,429.

The ethylene n-butyl acrylate copolymers (EnBA) will typically contain 15 to 45 weight percent n-butyl acrylate (nBA). In a particularly useful embodiment of the present invention, the EnBA copolymers will have from about 20 to about 40 weight percent nBA copolymerized. The melt index of these copolymers can range from fractional values up to 400 or above. Most usually, the melt index of the EnBA will be from about 0.5 to about 125, and more preferably, from 0.5 up to 50 for the intended application. All melt indexes referred to herein are determined at 190° C. in accordance with ASTM D1238, condition E, and are expressed as grams per 10 minutes.

Another polymer composition that can be employed in the instant invention as the non-crosslinked component is a copolymer of ethylene and an $\alpha,\omega$-diene. Suitable $\alpha,\omega$-dienes employed in the present invention are represented by the following formula:

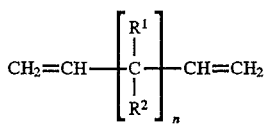

wherein $R^1$ and $R^2$ are each independently a hydrogen atom or an alkyl containing from 1 to 8 carbon atoms, and n is an integer of 1 to 3.

Suitable $\alpha,\omega$-dienes encompassed by the aforementioned formula include, 1,4 hexadiene, 1,5 hexadiene, 1,6 heptadiene, 3-methyl-1,4-hexadiene, 3-methyl 1,5-hexadiene, 3-methyl-1,6-heptadiene, 4-methyl-1,6-heptadiene, 3,3-dimethyl-1,4-hexadiene, 3,4-dimethyl-1,5 hexadiene, 4,4-dimethyl-1,6-heptadiene and 4-methyl-1,6-heptadiene. Such $\alpha,\omega$-dienes copolymers are produced by conventional methods well known in the art. See, for example, European Patent Appln. No. 92203227.1, U.S. Pat. Nos. 3,984,610, 3,357,961 and 4,602,077.

It should be noted that when the ethylene copolymer contains an $\alpha,\omega$-diene it will constitute about 0.1 to about 10% of the copolymer, the remainder being ethylene. In a preferred embodiment, the ethylene copolymer contains from about 0.2 to about 5% of the $\alpha,\omega$-diene, the remainder being ethylene.

The peroxides employed in the instant invention are any of the commonly employed peroxides that are utilized in the prior art to initiate polymerization. More specifically, it is preferred to utilize peroxides which produce free radicals, the decomposition of which is negligible below 120° C., and the half-life of which is high, generally greater than 1 minute at 160° C. Suitable peroxides which encompass the foregoing mentioned properties are, for example, di-(t-butyl) peroxide, dicumyl peroxide, 2,5-dimethyl-2,5-di(t-butylperoxy)-hexane, 2,5-dimethyl-2,5-di-(t-butylperoxy)-hexyne-3, butyl-4,4-bis-(t-butyl peroxyvalerate), cumyl hydroperoxide, 1,1-bis-(t-butylperoxy)-3,3,5-trimethylcyclohexane, 1,3-di-(t-butylperoxy)di-isopropylbenzene, benzoyl peroxide, t-butyl hydroperoxide, t-butyl peroxybenzoate, cumene hydroperoxide, lauroyl peroxide, t-butyl peroxy acetate, t-butyl peroxide methyl ethyl ketone peroxide, t-butyl cumyl peroxide, and (t-butylperoxy)-butyrate. The preferred peroxide employed in the instant invention is 2,5-dimethyl-2,5-di-(t-butylperoxy)-hexyne-3.

The quantity of peroxide utilized in the instant invention is such that the peroxide will be only physically adsorbed onto the non-crosslinked polymeric component or onto the surface of a blend of the high propylene polymeric component and the non-crosslinked second polymeric component. As stated hereinabove, the amount of peroxide employed in the present invention does not affect the long-chain branching of the non-crosslinked polymeric component. Instead, the amount of peroxide employed in the instant invention is believed to be sufficient to form free radicals on the non-crosslinked polymeric component, thereby improving the ability of that component to be joined with the high propylene polymeric component.

Typically, up to 1000 ppm of peroxide based on the non-crosslinked polymeric component can be employed in the present invention depending on the type of polymeric composition utilized. More preferably, the quantity of peroxide employed in the instant invention ranges from about 100 to about 1000 ppm, and most preferably, about 300 to about 900 ppm of peroxide is employed herein. If the quantity of peroxide is below or above the limit specified herein, the PP/PE blends will tend not exhibit a viscosity upturn in the rheological data.

In the processes of the present invention, the peroxide is either intimately precontacted with the non-crosslinked polymeric component or intimately contacted with a blend of the non-crosslinked polymeric component and the high propylene polymeric component at a temperature well below the decomposition temperature of the peroxide and the melting point of the polymers. It is once again emphasized that such contacting does not destroy the long-chain branching of the non-crosslinked polymeric component. Rather, its function is to improve the ability of the non-crosslinkable component to join with the high propylene content polymeric component.

More particularly, the aforementioned polymers are precontacted or contacted with a peroxide at a temperature of about 20° to about 70° C. for a period of time from about 1 to about 10 minutes in a Henschel type mixer. More preferably, the peroxide (pre)contacting steps occur at a temperature of about 35° to about 60° C. for a period of time from about 2 to about 6 minutes. Most preferably, the peroxide is adsorbed onto the surface of the polymers at a temperature of about 50° C. for a period of time of about 4 minutes.

After the peroxide precontacting step, the peroxide adsorbed non-crosslinked polymeric component is then melt-mixed with a high propylene polymeric component in a conventional mixer or extruder at a temperature of about 170° to about 300° C. More preferably, melt-mixing occurs at a temperature of about 190° to about 250° C. Most preferable, melt-mixing occurs at a temperature of about 210° to about 240° C.

As stated hereinabove, the polymeric components and the peroxide are blended or melt mixed by any conventional method; but preferably they are blended or melt mixed in an extruder. One or more extruders may also be used in blending or melt mixing steps of the instant invention. In a preferred embodiment, twin-screw extruder is employed.

In accordance with the present invention, the final PP/PE blend will be composed of about 5 to about 40 wt. % of the non-crosslinked polymeric component and about 95 to about 60 wt. % of the high propylene polymeric component. Preferably, the blend will consist of about 10 to about 30 wt. % of the non-crosslinked polymeric component and about 90 to about 70 wt. % of the high propylene polymeric component. Most preferably, the blend will consist of about 20 wt. % of a non-crosslinked polymeric component and 80 wt. % of the high propylene polymeric component.

The high melt flow rate thermoplastic polymeric blends of the instant invention are further characterized as having a melt flow rate value at 230° C. and a 2160 gram load, as measured by A.S.T.M. D 1238–86, of about 5 to about 150 g/10 min. More preferably, the blends of the instant invention have a melt flow rate of about 20 to 100 g/10 min. For extrusion coating applications, the blends of the instant invention have a melt flow rate value of about 40 to about 80 g/10 min.

The present invention further relates to the PP/PE blends that are produced from the processes of the instant invention. Such PP/PE blends that are produced from the instant invention exhibit superior rheological properties, especially melt strength, compared with prior art blends. Moreover, the PP/PE blends of the instant invention exhibit markedly reduced draw resonance behavior. Thus, the PP/PE blends of the instant invention are suitable for a wide variety of applications, such as thermoforming, blow molding and extrusion coatings.

The PP/PE blend of the instant invention also exhibit a pronounced upturn at low frequencies in their dynamic rheological data. By upturn, we mean that dynamic complex viscosity increases with decreasing frequencies at frequencies of less than about 1.0 rad/sec. In contrast, blends prepared from prior art processes will generally exhibit a limiting constant value at frequencies of about <1.0 rad sec., i.e. the slope approaches zero in that range. This viscosity upturn, which is measured in terms of $G_o^*$, is an indication that the blends of the instant invention have superior melt strength compared with prior art blends.

Typically the viscosity upturn, $G_o^*$, of the blends of the instant invention are above 10 dyne/cm$^2$. It is noted that a value of $G_o^*$ below 10 dyne/cm$^2$ denotes no viscosity upturn at frequencies of less than about 1.0 rad/sec. More preferably, the blends of the instant invention have $G_o^*$ values ranging from about 10 to about 2000 dyne/cm$^2$. Most preferably, the $G_o^*$ values of the blends of the instant invention range from about 50 to about 1000 dyne/cm$^2$.

Moreover, the blends of the instant invention have melt strength ranging from about 1.0 to about 3.0 cN (centi Newton). More preferably, the blends of the instant invention have melt strengths ranging from about 1.2 to about 2.0 cN.

A preferred blend of the instant invention comprising an ethylene copolymer having an unsaturated alkoxysilane grafted thereto. The most preferred blend of the instant invention is a blend which comprises an ethylene copolymer having vinyltriethoxysilane grafted thereon.

The rheological properties of each blend produced by the instant invention were determined by using a Rheometrics Mechanical Spectrometer (RMS). Specifically, a RMS (Rheometrics Mechanical Spectrometer, Model 605) was used to obtain complex viscosities ($\eta^*$) and storage modulus (G') measurement at 190° C. and 210° C. for frequencies ranging from 0.02 to 250 rad/sec. of each blend. A cone and plane geometry with a diameter of 25 or 50 mm and a cone angle of 0.1 radians was used. The rheological properties were determined using standard test procedure ASTM D 4440-84.

The measurement of viscosity upturn, $G_o^*$ of each blend was determined from the rheological data using a modified Casson plot of $\sqrt{G^*}$ vs. $\sqrt{\omega}$ wherein G* is the absolute value of dynamic modulus and $\omega$ is the frequency. The plot was used to obtain an intercepted value $G_o^*$ at $\omega=0$ by the linear extrapolation method.

The following examples are given to illustrate the scope of the present invention. Because these examples are given for illustrative purposes only, the invention embodied therein should not be limited thereto.

EXAMPLE 1

A peroxide modified polypropylene/polyethylene blend was prepared in accordance with the preferred method of the present invention and its dynamic rheological properties were determined. Specifically, the PP/PE blend was prepared by intimately precontacting in a twin-screw extruder, 20 weight percent of an ethylene copolymer comprising low density polyethylene (melt index is 3.5) and vinyltriethoxysilane (VTES) with 900 ppm of 2,5-dimethyl-2,5-di-(t-butylperoxy)-hexyne-3 ("LUPERSOL 130") at 50° C. to form a peroxide adsorbed composition. The ethylene copolymer was prepared in accordance with the procedure outlined in U.S. Pat. No. 3,392,156.

To the thus formed peroxide adsorbed polymeric composition, was added 80 weight percent of a propylene homopolymer with about 97% isotacticity. This mixture was then melt extruded using 1½- twin screw extruder with exit melt temperature of about 230° C.

The melt tension for the above blend was measured at 190° C. using a die having a radius of about 1.0 mm and a length/radius equal to 20 in at a constant speed rheometer, such as made by Instron Corporation or Goettfert, such that a constant apparent wall shear rate of 29 sec$^{-1}$ was imposed. The molten filament exiting the die was then subsequently stretched by a pair of toothed wheels having radii of 1 mm and a distance of 90 mm from the die. The frequency of rotation of the wheels was then increased linearly with time while the drawn down force was recorded.

The rheological data for this PP/PE blend is shown in Table I. As illustrated therein, the blend of this example had a $G_o^*$ value of 350 dyne/cm$^2$ and a melt strength value of 1.5 cN. As mentioned hereinabove, a $G_o^*$ value of >10 dyne/cm$^2$ indicates an upturn in the dynamic rheological data. This upturn is clearly illustrated in FIG. 1 wherein a tailup in the viscosity profile is observed at frequencies of less than about 1 rad/sec. Moreover, the PP/PE blend prepared in accordance with the procedure outlined above did not exhibit any appreciable draw resonance behavior at stretching speeds of about 280 mm/sec in a Goettfert rheotens tester.

EXAMPLE 2

A polypropylene/polyethylene blend was prepared in accordance with the alternative process described in the present invention. More specifically, a blend containing 80 wt. % of the polypropylene homopolymer of Example I and 20 wt. % of the LDPE copolymer of Example I were intimately contacted with 900 ppm of LUPERSOL 130.

This blend containing adsorbed peroxide was mixed in a twin-screw extruder at 230° C. and then cooled to room temperature to form a peroxide modified PP/PE blend.

The rheological properties of this PP/PE blend prepared in accordance with the alternative process of the instant invention are shown in Table I and in the sole FIGURE. Specifically, the PP/PE blend of this example had a $G_o^*$ value of 65 dyne/cm$^2$ and a melt strength of 1.27 cN. More importantly, the blend did not exhibit any appreciable draw resonance behavior.

Comparative Example 1

A polypropylene/polyethylene blend was prepared using a conventional prior art method. Specifically, the blend was prepared by first visbreaking 80 wt. % of polypropylene homopolymer of Example 1 with 350 ppm of LUPERSOL 130. This visbroken polypropylene composition is then blended with 20 wt. % of the LDPE copolymer described in Example 1.

The rheological properties of this comparative example are shown in Table I and in FIG. 1. As can be seen therein, no viscosity upturn is exhibited at frequencies of about <1.0 rad/sec. Rather, the viscosity profile levels off, i.e. flattens, at frequencies less than about 1.0 rad/sec. This is clearly illustrated in the sole FIGURE and in Table 1 wherein the $G_o^*$ value of this blend was determined to be 1.0 dyne/cm$^2$. It is also noted that the blend of this comparative example had a melt strength value of 0.94 cN which is considerably lower than the melt strength values of the previous two examples. Moreover, the PP/PE blend prepared using this prior art technique exhibit draw resonance behavior.

Comparative Example 2

The composition of comparative Example 2 comprises a polypropylene homopolymer which has been visbroken in the presence of 300 ppm of LUPERSOL 130. No ethylene copolymer was blended with this visbroken composition.

The rheological properties of this composition is also shown in Table I. Briefly, this visbroken PP composition had a $G_o^*$ value of 2.0 dyne/cm$^2$ which signifies that the blend does not exhibit any viscosity upturn in its rheological data. Moreover, the composition of this comparative example exhibited draw resonance behavior.

EXAMPLE 3

A PP/PE blend was prepared in accordance with the procedure described in Example 1 except that a LDPE homopolymer (M.I.≈1) was employed instead of the ethylene copolymer.

The rheological properties of this PP/PE blend are also shown in Table I. The blend had a value of $G_o^*$ of 150 dyne/cm$^2$ which indicates that the blend of this example exhibited a viscosity upturn at frequencies of less than about 1 rad/sec. Moreover, the blend containing 80% PP homopolymer and 20% of a peroxide modified LDPE homopolymer had a melt strength value of about 1.24 cN and no draw resonance behavior was observed.

EXAMPLE 4

A PP/PE blend was prepared in accordance with the procedure described in Example 2 except that a LDPE homopolymer having a melt index of about 1 was utilized instead of the ethylene copolymer.

The rheological properties of this blend are shown in Table I. The $G_o^*$ value for this blend was 80 dyne/cm$^2$ which indicates a viscosity upturn in the rheological data for this blend. Furthermore, the blend of this example did not exhibit any appreciable draw resonance behavior.

Comparative Example 3

A blend containing 80% visbroken polypropylene homopolymer and 20% LDPE homopolymer was prepared in accordance with the procedure disclosed in Comparative Example I.

The rheological properties of the resultant blend are shown in Table I. Specifically, this comparative example illustrates that the prior art processes which employ visbroken PP do not exhibit the characteristic viscosity upturn of the blends of the present invention. Moreover, the blend of this comparative example exhibits draw resonance behavior whereas the blends of the instant invention, as described in Examples 4 and 5 above, do not exhibit draw resonance behavior.

EXAMPLE 5

A PP/PE blend was prepared in accordance with the procedure outlined in Example 1 except that different amounts of the polypropylene homopolymer and ethylene copolymer were employed. Specifically, the blend contained 60% of the polypropylene polymer and 40% of the peroxide modified LDPE-VTES copolymer.

The rheological data for this blend is shown in Table I. As is seen therein, the PP/PE blend of this example had a $G_o^*$ value of 2950 dyne/cm$^2$, which indicates that the viscosity profile of this blend exhibits an upturn at frequencies of less than about 1.0 rad/sec.

EXAMPLE 6

A PP/PE blend was prepared in accordance with the procedure described in Example 2 except that the pre-blend contained 60% PP homopolymer and 40% of the ethylene copolymer.

The rheological properties of this example is shown in Table I. Once again, as was the case in Example 5, the blend prepared from the alternative method of the instant invention exhibits a characteristic tail-up in its viscosity profile.

Comparative Example 4

A PP/PE blend was prepared in accordance with the procedure described in Comparative Example 1 except that 60% of the PP homopolymer and 40% of the ethylene copolymer was employed.

The rheological data of this comparative example is shown in Table I. The low value of $G_o^*$ indicates that there is no viscosity upturn for this blend.

EXAMPLES 7–9

These examples illustrate the effects of the amount of peroxide that is employed in the precontacting step. Specifically, PP/PE blends were prepared in accordance with Example 5 except that various amounts of peroxide were adsorbed onto the LDPE-VTES copolymer.

The rheological data, i.e. melt flow rate (MFR) and $G_o^*$, of these blends are shown in Table II. Also, the corresponding rheological data for the PP/PE blend of Example 5 is shown therein for comparison. The results of these experiments indicate that it is possible to vary the degree of viscosity upturn and MFR of the composition by varying the amount of peroxide that is precontacted with the LDPE-VTES copolymer.

Examples 10–13

Polypropylene/polyethylene blends were prepared in accordance with the procedure described in Example 1 except that 75% of the polypropylene polymer and 25% of an ethylene copolymer other than the LDPEVTES copolymer were employed.

The following tabulations describes the exact components that are used these examples: (Note: A denotes adsorbed peroxide (900 ppm))

Example 10: 75% PP+A [25% LDPE-EVA copolymer containing 19% VA]

Example 11: 75% PP+A [25% LDPE-EnBA copolymer containing 19% nBA]

Example 12: 75% PP+A [25% LDPE-EVA copolymer containing 2.5% VA]

Example 13: 75% PP+A [25% LDPE-EnBA copolymer containing 5% nBA

The rheological data for the blends of the foregoing examples is shown in Table III. As was observed with other blends prepared in accordance with the instant invention, the PP/PE blends of Examples 10–13 exhibited an upturn in the viscosity profile at low frequencies.

TABLE I

| EXAMPLE | MFR 230° C./ 2160 g | $G_o^*$ [dyne/ cm$^2$] | MELT STRENGTH (cN) | DRAW RESO- NANCE |
|---|---|---|---|---|
| 1 | 18 | 350 | 1.50 | No |
| 2 | 18 | 65 | 1.27 | No |
| CE1 | 19 | 1 | 0.94 | Yes |
| CE2 | 19 | 2 | 0.74 | Yes |
| 3 | 22 | 150 | 1.24 | No |
| 4 | 21 | 80 | 1.09 | No |
| CE3 | 19 | 4 | 1.00 | Yes |

TABLE I-continued

| EXAMPLE | MFR 230° C./ 2160 g) | $G_o^*$ [dyne/ cm$^2$] | MELT STRENGTH (cN) | DRAW RESO- NANCE |
|---|---|---|---|---|
| 5 | 5.0 | 2950 | — | — |
| 6 | 4.3 | 1040 | — | — |
| CE4 | 2.0 | 5 | — | — |

*Note: A $G_o^*$ value > 10 dyne/cm$^2$ indicates a viscosity upturn.

TABLE II

Effect of Peroxide Level

| EXAMPLE | PEROXIDE (PPM) | MFR (230° C./ 2160 g) | $G_o^*$ (dyne/cm$^2$) |
|---|---|---|---|
| 5 | 900 | 5.0 | 2950 |
| 7 | 800 | 11.1 | 2490 |
| 8 | 500 | 7.8 | 1850 |
| 9 | 300 | 5.9 | 1090 |

TABLE III

| EXAMPLE | $G_o^*$ (dyne/cm$^2$) |
|---|---|
| 10 | 1540 |
| 11 | 1030 |
| 12 | 260 |
| 13 | 190 |

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A process for preparing a high melt flow rate thermoplastic polymer blend having a melt flow rate at 230° C. of from about 5 to about 150 g/10 minutes comprising the steps of:

(a) adding a peroxide component, in an amount ranging from about 100 to about 1000 ppm of the non-crosslinked polymeric component, at a temperature from about 20° C. to about 700° C. for a period of time from about 1 to about 10 minutes to produce a peroxide-adsorbed component wherein the non-crosslinked polymeric component is a LDPE or an ethylene copolymer containing a vinyl acetate, a methyl acrylate, a n-butyl acrylate, an α,ω-diene or an unsaturated alkoxysilane; and (b) melt mixing the peroxide-adsorbed polymeric component of step (a) with a polypropylene homopolymer at a temperature of about 170° C. to about 300° C. wherein the polymeric blend comprises about 5 to about 40 weight percent of the non-crosslinked polymeric component and about 95 to about 60 percent by weight of the polypropylene homopolymer.

2. The process according to claim 1 wherein from about 300 to about 900 ppm of the peroxide compound is employed in the step (a).

3. The process according to claim 1 wherein step (a) is conducted at a temperature from about 35° to about 60° C. for a period of time from about 2 to about 6 minutes.

4. The process according to claim 1 wherein the unsaturated alkoxysilane has the formula:

$$R-Si(R^*)_n(Y)_{3-n}$$

wherein R is an ethylenically unsaturated hydrocarbon radical having from 2 to 6 carbon atoms, R* is a hydrocarbon radical having from 1 to 10 carbon atoms, Y is an alkoxy group having from 1 to 4 carbon atoms, and n is an integer from 0 to 2.

5. The process according to claim 4 wherein the unsaturated alkoxysilane is a vinyltrialkoxysilane.

6. The process according to claim 5 wherein the vinyltrialkoxysilane is vinyltrimethoxysilane or vinyltriethoxysilane.

7. The process according to claim 1 wherein the unsaturated alkoxysilane constitutes from about 20 to about 0.25% by weight of the copolymer composition, the remainder being ethylene.

8. The process according to claim 7 wherein the unsaturated alkoxysilane constitutes from about 10 to about 0.5% by weight of the copolymer composition, the remainder being ethylene.

9. The process according to claim 1 wherein vinyl acetate constitutes from about 2 to about 45% of the copolymer with the balance being ethylene.

10. The process according to claim 9 wherein vinyl acetate constitutes from about 5 to about 30% of the copolymer with the balance being ethylene.

11. The process according to claim 1 wherein n-butyl acrylate comprises from about 15 to about 45 wt. % of the copolymer, with the remainder being ethylene.

12. The process according to claim 1 wherein the α,ω-diene has the formula:

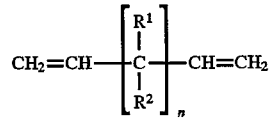

wherein $R^1$ and $R^2$ are each independently a hydrogen atom or an alkyl containing from 1 to 8 carbon atoms; and n is an integer of 1 to 3.

13. The process according to claim 1 wherein the peroxide is selected from the group consisting of di-(t-butyl) peroxide, dicumyl peroxide, 2,5 dimethyl- 2,5-di-(t-butylperoxy)-hexane, 2,5-dimethyl-2,5-di-(t-butylperoxy)-hexyne-3, butyl-4,4-bis(t-butyl peroxyvalerate), cumyl hydroperoxide, 1,1,-bis-(t-butylperoxy) di-isopropylene, benzoyl peroxide, t-butyl hydroperoxide, t-butyl peroxybenzoate, cumene hydroperoxide, lauroyl peroxide, t-butyl peroxy acetate, t-butyl peroxide methyl ethyl ketone peroxide, t-butyl cumyl peroxide, and (t-butylperoxy)-butyrate.

14. The process according to claim 13 wherein the peroxide is 2,5-dimethyl-2,5-di-(t-butylperoxy)-hexyne-3.

15. The process according to claim 1 wherein melt mixing occurs at a temperature of about 210° to about 240° C.

16. The process according to claim 1 wherein the non-crosslinked polymeric component constitutes about 10 to about 30 wt. % of the blend with the remainder being the polypropylene homopolymer.

17. A process for preparing a high melt flow rate thermoplastic polymeric blend having a melt flow rate at 230° C. of from about 5 to about 150 g/10 minutes comprising the steps of:

(a) blending a non-crosslinked polymeric component with a polypropylene homopolymer wherein the noncrosslinked polymeric component is a LDPE or an ethylene copolymer containing a vinyl acetate, a methyl acrylate, a n-butyl acrylate, an α,ω-diene or an unsaturated alkoxysilane;

(b) adding the blend of step (a) with a peroxide compound, in an amount ranging from about 100 to about 1000 ppm of the non-crosslinked polymeric component, at a temperature from about 20° C. to about 70° C. for a period of time from about 1 to about 10 minutes to allow the peroxide to physically adsorb onto the surface of the blend; and (c) melt mixing the blend of step (b) at a temperature at a temperature of about 170° C. to about 300° C. wherein the polymeric blend comprises about 5 to about 40 weight percent of the non-crosslinked polymeric component and about 95 to about 60 percent by weight of the polypropylene homopolymer.

18. The process according to claim 17 wherein the unsaturated alkoxysilane has the formula:

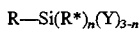

wherein R is an ethylenically unsaturated hydrocarbon radical having from 2 to 6 carbon atoms, R* is a hydrocarbon radical having from 1 to 10 carbon atoms, Y is an alkoxy group having from 1 to 4 carbon atoms, and n is an integer from 0 to 2.

19. The process according to claim 18 wherein the unsaturated alkoxysilane is a vinyltrialkoxysilane.

20. The process according to claim 19 wherein the vinyltrialkoxysilane is vinyltrimethoxysilane or vinyltriethoxysilane.

21. The process according to claim 17 wherein the unsaturated alkoxysilane constitutes from about 20 to about 0.25% by weight of the copolymer composition, the remainder being ethylene.

22. The process according to claim 21 wherein the unsaturated alkoxysilane constitutes from about 10 to about 0.5% by weight of the copolymer composition, the remainder being ethylene.

23. The process according to claim 17 wherein vinyl acetate constitutes from about 2 to about 45% of the copolymer with the balance being ethylene.

24. The process according to claim 23 wherein vinyl acetate constitutes from about 5 to about 30% of the copolymer with the balance being ethylene.

25. The process according to claim 17 wherein n-butyl acrylate comprises from about 15 to about 45 wt. % of the copolymer, with the remainder being ethylene.

26. The process according to claim 17 wherein the α,ω-diene has the formula:

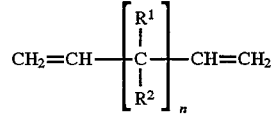

wherein $R^1$ and $R^2$ are each independently a hydrogen atom or an alkyl containing from 1 to 8 carbon atoms; and n is an integer of 1 to 3.

27. The process according to claim 17 wherein the two polymeric components are blended at a temperature from about 210° to about 240° C.

28. The process according to claim 17 wherein the peroxide compound is selected from the group consisting of di-(t-butyl) peroxide, dicumyl peroxide, 2,5 dimethyl-2,5-di-(t-butylperoxy)-hexane, 2,5-dimethyl-2,5-di-(t-butylperoxy)-hexyne-3, butyl-4,4-bis(t-butylperoxyvalerate), cumyl hydroperoxide, 1,1,-bis-(t-butylperoxy) di-isopropylene, benzoyl peroxide, t-butyl hydroperoxide, t-butyl peroxybenzoate, cumene hydroperoxide, lauroyl peroxide, t-butyl peroxy acetate, t-butyl peroxide methyl ethyl ketone peroxide, t-butyl cumyl peroxide, and (t-butylperoxy)-butyrate.

29. The process according to claim 28 wherein the peroxide is 2,5-dimethyl-2,5-di-(t-butylperoxy)-hexyne-3.

30. The process according to claim 17 wherein from about 300 to about 900 ppm of the peroxide compound is employed.

31. The process according to claim 17 wherein the non-crosslinked polymeric component constitutes about 10 to about 30 wt. % of the blend with the remainder being the polypropylene homopolymer.

32. A polymeric blend prepared from the process of claim 1.

33. A polymeric blend according to claim 32 wherein the blend comprises a peroxide modified copolymer of ethylene and vinyltriethoxysilane and a polypropylene homopolymer.

* * * * *